United States Patent [19]
Holden et al.

[11] 3,917,499
[45] Nov. 4, 1975

[54] METHOD OF BONDING COMPONENTS MADE OF THERMOPLASTIC MATERIALS

[75] Inventors: Homer N. Holden, Sylva; Vernon D. Browning; Bascom D. Blevins, both of Waynesville, all of N.C.

[73] Assignee: Dayco Corporation, Dayton, Ohio

[22] Filed: Oct. 11, 1973

[21] Appl. No.: 405,378

[52] U.S. Cl. ............ 156/144; 138/122; 138/133; 156/198; 156/244; 156/308; 427/421
[51] Int. Cl.² ................................. B29D 23/05
[58] Field of Search .......... 156/143, 144, 198, 212, 156/244, 284, 287, 293, 303.1, 306, 307; 138/118, 125, 126, 127; 117/106 R; 118/48, 118/325, 326

[56] References Cited
UNITED STATES PATENTS

| | | | |
|---|---|---|---|
| 2,783,819 | 3/1957 | Duff | 156/144 |
| 2,797,730 | 7/1957 | Martin | 156/144 |
| 2,931,069 | 4/1960 | McCormick | 156/144 |
| 2,949,133 | 8/1960 | Rothermel et al. | 156/144 |
| 2,963,749 | 12/1960 | Paulic | 156/144 |
| 3,156,608 | 11/1964 | Kamins et al. | 156/307 |
| 3,287,194 | 11/1966 | Waddell, Jr. | 156/144 |
| 3,290,196 | 12/1966 | Duff | 156/144 |
| 3,445,308 | 5/1969 | Osborn | 156/144 |
| 3,741,155 | 6/1973 | Hunder | 118/326 |

*Primary Examiner*—Douglas J. Drummond
*Assistant Examiner*—F. Frisenda, Jr.
*Attorney, Agent, or Firm*—Reuben Wolk

[57] ABSTRACT

A method of bonding components having exposed surfaces made of thermoplastic materials is provided wherein the exposed surface of one of the components is treated with a liquid plasticizer and the exposed surface of another of the components is placed against the treated exposed surface and at least one of the exposed surfaces is heated to a temperature above ambient whereupon the surfaces are cooled whereby such surfaces are fused together.

5 Claims, 8 Drawing Figures

METHOD OF BONDING COMPONENTS MADE OF THERMOPLASTIC MATERIALS

BACKGROUND OF THE INVENTION

Components made of thermoplastic materials are used widely throughout industry and it often becomes necessary to bond a plurality of these components together. It is common practice to utilize solvents and/or adhesives to bond such components together; however, solvents are generally comparatively dangerous to handle and use while adhesives are generally highly viscous which makes adhesives difficult to apply, and equipment associated therewith tends to be easily clogged whereby the use of either solvents or adhesives results in higher bonding costs.

This invention provides a method of bonding components made of thermoplastic materials which is less dangerous than methods employing solvents, more efficient than methods employing adhesives, and less expensive than methods employing either solvents or adhesives while assuring the provision of a high strength bond between components. This invention is particularly useful in the making of reinforced flexible conduits and comprises treating an exposed surface of one of a pair of components which are to be bonded with a liquid plasticizer, placing an exposed surface of another of the components against the treated exposed surface, heating at least one of the exposed surfaces to a temperature above ambient, and cooling the surfaces whereby the surfaces are fused together by the action of the plasticizer which tends to migrate between the thermoplastic materials of the components being bonded.

Other details, uses, and advantages of this invention will be readily apparent from the exemplary embodiments thereof presented in the following specification, claims, and drawing.

BRIEF DESCRIPTION OF THE DRAWING

The accompanying drawing shows present exemplary embodiments of this invention, in which.

DETAILED DESCRIPTION

Figure 1:
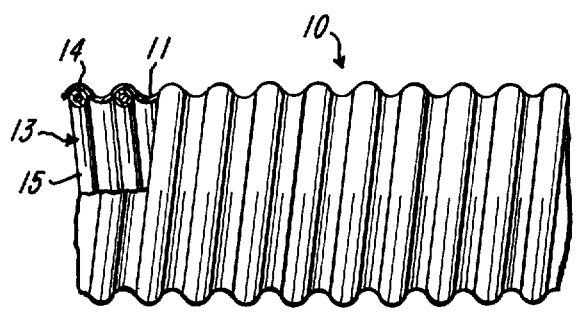
FIG. 1 is a view with parts in elevation, parts in cross section, and parts broken away illustrating a reinforced flexible conduit made by the method of this invention and comprised of an outer tube and an inner helically wound reinforcing member.

Reference is now made to FIG. 1 of the drawing which illustrates an exemplary embodiment of a reinforced flexible conduit 10 which has been made by the method of this invention and which is comprised of components having exposed surfaces made of thermoplastic materials. The conduit 10 comprises an outer tube 11 which is made of a suitable thermoplastic material and has an undulating configuration which in this example extends in a helical pattern. The tube is bonded against a reinforcing member which is designated generally by the reference numeral 13 and is comprised of a comparatively rigid electrically conductive central metal wire 14 and the wire 14 may be defined by a single strand or a plurality of suitably twisted strands. The member 13 has an outer tubular sleeve 15 made of a suitable thermoplastic material whereby the sleeve has an outside surface 16 made of a thermoplastic material.

The conduit 10 made utilizing the method of this invention is similar to the conduits disclosed in U.S. Pat. No. 2,822,857 to Rothermel et al and apparatus similar to the apparatus disclosed in carrying out the methods disclosed in the above mentioned patent may be utilized with some variations in carrying out the method of this invention.

However, the method of this invention results in the making of a flexible conduit which is comparatively less expensive and there is a more tenacious bond provided between its reinforcing member 13 and tube 11.

Figure 3:
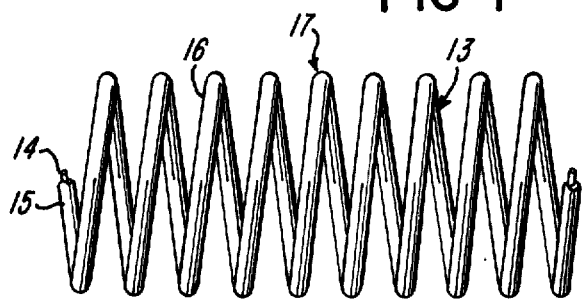
FIG. 3 is a view with parts broken away particularly illustrating the reinforcing member of the flexible conduit of FIG. 1 in its helically wound form.
Figure 4:
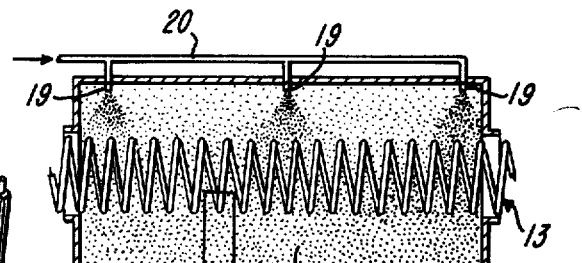
FIG. 4 is a schematic presentation particularly illustrating the reinforcing member of FIG. 3 being treated by coating its outside surface with a liquid plasticizer.
Figure 5:
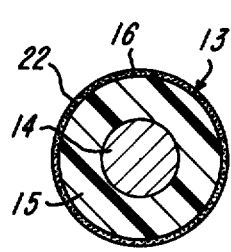
FIG. 5 is a cross-sectional view taken on the line 5—5 of FIG. 4 showing a thin coating of liquid plasticizer on the outside surface of the reinforcing member.

In making the reinforced flexible conduit 10 in accordance with the method of this invention, the reinforcing member 13, with its central metal wire 14 and outer thermoplastic sleeve 15, is wound or formed into a helical pattern as shown at 17 in FIG. 3 using any suitable apparatus or means known in the art. The exposed surface of the member 13 and in particular the exposed outside surface 16 of the sleeve 15 is treated by coating such outside surface 16 with a fluid plasticizer in the form of a liquid plasticizer. In this example, the helically wound member 13 is introduced and suitably supported in a chamber 18, as illustrated in FIG. 4, which has a plurality of spray nozzles 19 provided therein which are connected to a manifold 20 which in turn is suitably connected to a source (not shown) of liquid plasticizer whereby a mist of plasticizer, indicated by the dots 22 is provided in the chamber. The mist of plasticizer settles on and coats the exposed outside surface 16 of member 13 to define a coating which is also designated by the reference numeral 22. Although what amounts to a spray coating 22 has been applied on surface 16, it will be appreciated that any suitable technique may be provided for coating the outside surface 16 of member 13.

The tube 11 is preferably made of a thermoplastic material which has what is commonly referred to in the art as an "elastic memory" whereby the material employed is such that the tube retains its originally formed shape for prolonged time periods and if deformed from its original shape within the elastic limit of the material returns to such original shape. The tube 11 may be made using any technique or apparatus known in the art.

Figure 6:
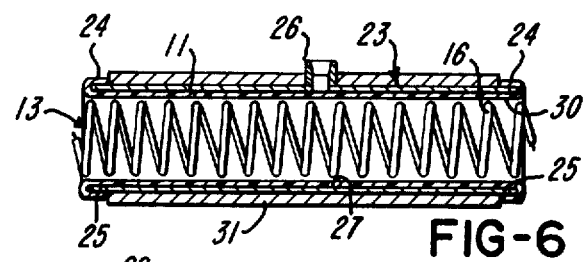
FIG. 6 is a view with parts in cross-section, parts in elevation and parts broken away particularly illustrating a method and associated apparatus by which the tube of FIG. 1 may be installed around and against the plasticizer coated reinforcing member so that these two components may be bonded together.

The tube 11 is placed within an apparatus or expander cylinder 23 of the type illustrated in FIG. 6 and the ends 24 of the tube are folded around the ends 25 of the apparatus 23. The apparatus 23 has an inside diameter which is larger than the normal relaxed diameter of the tube 11. Further, the normal relaxed inside diameter of the tube 11 is smaller than the outside diameter of the member 13 with its sleeve 15 and coating 22 on the outside surface 16 thereof. Once the tube 11 is placed within apparatus 23, with its opposite ends 24 folded as shown, a vacuum is applied to the apparatus 23 using connector 26 thereon and a suitable vacuum line and vacuum source (both not shown) are provided for this purpose whereupon atmospheric pressure within the tube will cause it to expand against the inside cylindrical surface 27 of the apparatus 23.

The helically wound reinforcing member 13 is then suitably installed in position therein utilizing any suitable technique known in the art whereupon the vacuum applied through connector 26 is released. Once the vacuum is released the elastic memory or character of tube 11 causes it to contract radially inwardly whereby its inside surface 30 is urged against the outside surface 16 with its coating 22 of plasticizer to create a controlled pressure between the adjoining surfaces which is determined by the elastic properties of the tube 11.

With a pressure being exerted between adjoining parts of the inside surface 30 of the tube 11 and the outside surface 16 of the member 13 suitable means in the form of a heating jacket 31 is employed to heat the tube 11 and in particular the inside surface 30 thereof and this heating action may be provided until any desired temperature is reached and for a time duration compatible with the elastomeric material used to make the tube 11 and sleeve 15 of member 13 as well as the character of the plasticizer. In general, the temperature to which the tube 11 is heated is above ambient temperature and as the tube is heated its inside surface 30 and the outside surface 16 with the coating 22 are heated above ambient.

Figure 2:
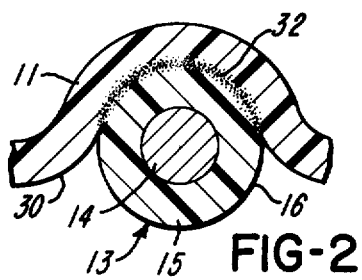
FIG. 2 is an enlarged fragmentary cross-sectional view particularly illustrating a fused bond between the reinforcing member and the outer tube of the flexible conduit of FIG. 1 which is made possible by using the method of this invention.

Once the tube 11 and reinforcing member 13 are removed from the apparatus and cooled or allowed to cool, they are fused together to define a fused area 32 therebetween as shown in FIG. 2. The fused area 32 is produced because it is believed that the plasticizer tends to migrate between the thermoplastic materials comprising members 11 and 13 to thereby provide a high strength bond between the surfaces 30 and 16 because the portions of these members adjacent these surfaces in essence flow or fuse together as an integral substantially unitary structure. Once the tube 11 and member 13 have cooled to room temperature the conduit 10 is defined.

In the above-described step of heating the adjoining surfaces 30 and 16, the heating was achieved after the surfaces were brought into contact using the heating jacket 31. The heating jacket 31 may be of any suitable type known in the art and may employ electrical heating elements, fluid heating means or other means. It will also be appreciated that the heating step or action may be provided before the vacuum on tube 11 is released and the tube allowed to contract around and against member 13. In this latter instance the temperature would be such that the tube 11 would not lose its elastic memory.

Figure 7:
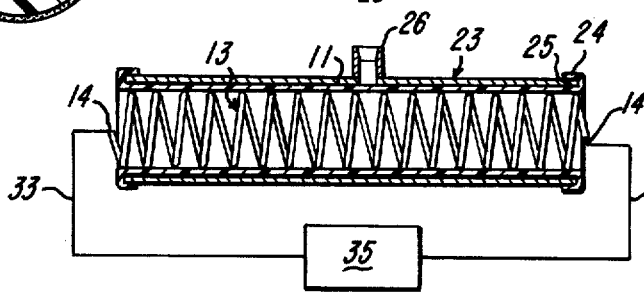
FIG. 7 is a view similar to FIG. 6 and illustrating a modified apparatus and method steps which may be used so that the tube and reinforcing member may be bonded together.

Instead of heating the plastic tube 11 and its inside surface 30, it will be appreciated that the heating action or step of the method may be achieved by heating the reinforcing member 13 and in particular its sleeve 15 and its outside surface 16 after coating thereof with the coating 22 of plasticizer. This heating action may be achieved in the manner illustrated in FIG. 7 which utilizes suitable electrical leads 33 and 34 connected to opposite ends of the electrically conductive wire member 14 of the reinforcing member 13 and the leads 33 and 34 are connected to a suitable source of electrical energy which is shown schematically at 35 and may be in the form of a battery or generator.

Figure 8:
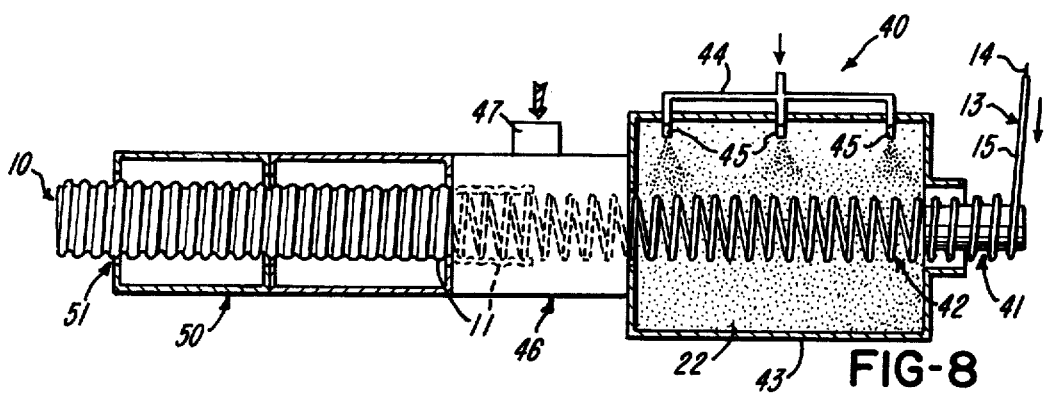
FIG. 8 is a schematic presentation particularly illustrating the method of this invention being carried out in a continuous process.

The method of this invention may also be achieved in a continuous uninterrupted manner as shown in FIG. 8 in the drawing. In particular, a reinforcing member, also designated by the reference numeral 13, and comprised of a metal wire 14 and a thermoplastic sleeve 15 is supplied in a continuous manner from a supply roll (not shown) to a continuous processing machine or apparatus which is shown schematically and designated generally by the reference numeral 40. The machine 40 has an automatic coiling apparatus 41 which coils the member 13 into helical form as shown at 42 whereby the member 13 has the helical configuration shown in FIG. 3.

The helically wound member 13 is then passed or continued through a chamber 43 where it is treated or coated with a coating 22 of plasticizer which is provided with a fluid plasticizer from a source thereof (not shown) through a manifold 44 and spray nozzles 45.

The member 13 with its coating of plasticizer 22 is then passed through an extrusion die 46 mounted in the apparatus 40 and suitable means are provided in the apparatus 40 isolating the spray or mist of plasticizer in chamber 43 from the die 46. The die is provided with thermoplastic material at an elevated temperature from an extruder (not shown) of known construction through an inlet 47 of the die and the thermoplastic material is extruded through an orifice of the die which has the helically coiled member passing centrally therethrough whereby the tube 11 is simultaneously defined and urged around and against the helically coiled member 13.

The extrusion of thermoplastic material through die 46 is achieved under heat and pressure whereby the entire tube 11 and hence its inside surface 30 is heated simultaneously with its formation; and, such inside surface 30 is brought by the extrusion process into contact with the outside surface 16 of member 13 with its coating of plasticizer 22 thereon with a contact pressure being exerted between these two surfaces. The extruded tube and reinforcing member are continued into a cooling chamber 50 and cooled and then moved completely out of the apparatus as shown at 51 as the completed conduit 10.

Thus, the method of this invention may be carried out in a continuous manner, as illustrated in FIG. 8, yet with all of the advantages of using the plasticizer 22 and the action thereof under the influence of slight pressure and heating of the inside surface 30 of the tube 11 to provide a bond which is in essence a fused integral construction as shown at 32 in FIG. 2.

The temperature to which the inside surface of the tube 11 and the outside surface of the member 13 may be heated may be any desired temperature above ambient. However, it has been found that best results are achieved when the heating is approximately equal to the plasticization temperature of the material used to make the tube 11. In the situation where the method of this invention is carried out continuously as shown in FIG. 8, it will be appreciated that by extruding the tube 11 concentrically around the helically formed reinforcing member 13 the tube is inherently at the desired plasticization temperature.

The method of this invention may be carried out utilizing any suitable thermoplastic material, and in one application of this invention, excellent results were obtained using polyvinyl chloride to define the sleeve 15 of the reinforcing member 13 as well as the tube 11.

Any suitable material may be used as the plasticizer 22; however, excellent results have been obtained using dioctyl phthalate and particularly between thermoplastic materials made of polyvinyl chloride.

In this disclosure of the invention the reinforcing member 13 is shown as being on the inside of the tube 11; however, it will be appreciated that the method of this invention may be utilized to fuse a helically wound reinforcing member similar to the member 13 concentrically around the outside of a tube similar to the tube 11.

While present exemplary embodiments of this invention, and methods of practicing the same, have been illustrated and described, it will be recognized that this invention may be otherwise variously embodied and practiced within the scope of the following claims.

What is claimed is:

1. A method of making a reinforced flexible conduit comprising the steps of forming a reinforcing member having an outside surface made of a thermoplastic material into a helical pattern, coating the entire outside surface with a liquid plasticizer, providing a tube made of a thermoplastic material, placing a surface of the tube against the coated outside surface, heating at least one of said surfaces to a temperature above ambient temperature, and cooling said surfaces whereby said tube and reinforcing member are fused together by said plasticizer, said coating step comprising introducing said reinforcing member into a chamber having a mist of said liquid plasticizer therein which settles on said outside surface as a coating.

2. A method as set forth in claim 1 and comprising the further step of urging said tube and said reinforcing member together to create a pressure between their adjoining surfaces.

3. A method as set forth in claim 1 in which said coating step comprises introducing said reinforcing member with its polyvinyl chloride sleeve installed thereover and after said forming step into said chamber having said mist of said liquid plasticizer therein in the form of dioctyl phthalate which settles on said outside surface as said coating.

4. A method as set forth in claim 3 and comprising the further step of expanding said tube so that its inside surface is arranged concentrically around and spaced from said outside surface of said reinforcing member and said urging step comprises releasing the expanded tube allowing it to contract whereby its inside surface is urged against the outside surface of the sleeve of said reinforcing member with a pressure therebetween.

5. A method of making a reinforced flexible conduit in a continuous uninterrupted manner comprising the steps of, continuously forming a reinforcing member having an outside surface made of a thermoplastic material into a helical pattern, passing the formed reinforcing member through a chamber and treating its entire outside surface with a mist of liquid plasticizer, continuing the coated formed member through an extrusion die, extruding a tube made of a thermoplastic material against and concentrically around said coated outside surface of said member, said extruding step providing simultaneous heating of said tube and its inside surface to thereby accelerate the action of said plasticizer, and passing the assembly defined by said member with the tube extruded thereagainst through a cooling station whereby said tube and reinforcing member are fused together by said plasticizer.

* * * * *